(12) United States Patent
Rudoy et al.

(10) Patent No.: US 6,433,990 B1
(45) Date of Patent: *Aug. 13, 2002

(54) FRANGIBLE ACTUATOR WITH REDUNDANT POWER SUPPLY

(75) Inventors: Edward Rudoy, Woodland Hills; Larry Leroy McCormick, Chatsworth; Edwin E. Vega, Woodland Hills; Craig W. Courtney, West Hills, all of CA (US)

(73) Assignee: Nea Electronics, Inc., Chatsworth, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/498,761

(22) Filed: Feb. 2, 2000

(51) Int. Cl.[7] .............................................. H01H 47/00
(52) U.S. Cl. ..................................................... 361/160
(58) Field of Search ........................... 361/160; 307/10.6

(56) References Cited

U.S. PATENT DOCUMENTS

| | | | |
|---|---|---|---|
| 4,057,260 A | 11/1977 | Sigott | 279/77 |
| 5,221,171 A | 6/1993 | Rudoy et al. | 411/433 |
| 5,312,147 A | 5/1994 | Rudoy et al. | 294/82.3 |
| 5,438,173 A | 8/1995 | Rudoy et al. | 200/52 R |
| 5,598,041 A | 1/1997 | Willis | 307/43 |
| 6,073,914 A | 6/2000 | Roth et al. | 254/29 A |
| 6,202,615 B1 * | 6/2001 | Pels et al. | 307/10.5 |
| 6,249,063 B1 * | 6/2001 | Rudoy et al. | 307/125 |

FOREIGN PATENT DOCUMENTS

| | | |
|---|---|---|
| DE | 196 49 739 | 6/1998 |
| GB | 2 067 034 | 7/1981 |

OTHER PUBLICATIONS

F. Shi et al. "Integrated Power Systems with Fault Tolerant Attributes" Apec. Annual Applied Power Electronics Conference and Exposition, US, New York, IEEE, vol. Conf. 12, Feb. 23, 1997, pp. 443–447, XP000736215 ISBN: 0–7803–3705–0.

* cited by examiner

*Primary Examiner*—Jessica Han
*Assistant Examiner*—Pia Tibbits
(74) *Attorney, Agent, or Firm*—Lewis B. Sternfels

(57) ABSTRACT

A device for restraining and then quickly releasing objects, comprising two half-spools that are held in place by a coil spring. The spring is attached at one end to one of the spools and at another end is held in place by a frangible wire, which is in turn connected to redundant power supplies. Insulation is provided by coating a base portion with aluminum oxide and attaching an insulator hub to the end of the spring held by the frangible wire. Cut-outs within the coils are provided to maximize separation force.

11 Claims, 5 Drawing Sheets

FRANGIBLE ACTUATOR WITH REDUNDANT POWER SUPPLY

TECHNICAL FIELD OF THE INVENTION

The invention relates to non-explosive, frangible actuator devices for quickly releasing loads.

BACKGROUND OF THE INVENTION

Non-explosive frangible actuators are used to perform a task, often releasing a tensile load (such as a stowed solar array or antennae on a satellite) upon electronic command. Because of the damage of explosion in aerospace applications, and the weight of the satellite and other loads to be released, actuators must first restrain and then quickly release tremendous loads with a minimum mechanical shock imparted to the surrounding separate components or devices. Typically, such actuators will utilize a multi-part spool held together by a wound restraining wire (with memory). A load is restrained by the barrier formed by the intersection of the parts of the spool (when held together by the restraining wire). A pin is provided which bares against the spool at one end of the pin and holding the load at the other end of the pin. A small frangible fuse keeps the restraining wire from unraveling until a weak electrical current causes the frangible fuse to fail in tension, allowing the restraining wire to unwind and thus freeing the parts of the spool to separate, eliminating the resistance to the load. Some actuators apply the full force of the load to the spool, while others utilize a series of moving parts to create a mechanical advantage, so that only a small portion of the load need be resisted by the spool. Typically prior art devices used a single power supply. As detailed below, prior art devices have exhibited a number of problems.

In many applications, such as aerospace, the device must function properly the first time, and at a precise, predetermined time. The lack of a redundant power supply and electrical wiring can cause the device to fail or not operate successfully.

Prior art devices have also employed plastic actuators. In the past, metal actuators were thought to be impractical because the power to the fuse wire could short or ground on the entire device, causing the fuse wire not to actuate and perform the required function. Such devices are limited in the load that can be directly restrained by the actuator spool by the tensile strength of the plastic. One prior art device by G & H Technology ("G & H 8024") attaches an insulator on the fuse wire, which unfortunately becomes debris after actuation. The G & H 8024 also utilizes a ceramic actuator, made of aluminum oxide ($Al_2O_3$) to make their device as non-conductive as possible. Just as with plastic actuator spools, aluminum oxide lacks the tensile strength of steel.

Prior art "mechanical advantage devices" have an additional problem. In such devices, the load is released almost instantaneously, risking high mechanical shock output. Although "mechanical advantage" actuators have a series of events that precede release (e.g., fuse failure causing spool separation resulting in a series of parts moving and releasing other parts), the actual release of the load is quite sudden.

Prior art devices can only be loaded from one side (i.e., the load can either be pulling on one side or pushing against the other direction). Thus separately designed actuators must be employed for different applications.

Additionally, prior art units, such G & H model no. 8024, use a conical (or funnel) shape for the top of a release pin. As discussed within, this allows no tolerance for misalignment.

What is needed is a frangible actuator that uses a direct release mechanism, has a redundant power supply, allows use of a metal spool release without grounding the fuse, and avoids failure due to excessive friction during release.

SUMMARY OF THE INVENTION

In a first embodiment, the present invention provides a redundant power supply for an actuator with two actuator terminals, which block and then release a load responsive to current from the power supply, which includes at least two power supplies, each connected to the actuator in parallel whereby should one fail upon activation, the other will still actuate the device.

In a second embodiment, the present invention provides a frangible actuator comprising an actuation barrier with a plurality of restraining parts, having a blocked position and an open position; a frangible restraint for maintaining and releasing said plurality of parts from the blocked position, the frangible restraint failing in tension upon the application of an electrical current; a restraining wire having a secured position and a release position, for holding and releasing the plurality of parts; an insulator hub made of a nonconductive material surrounding a loop end of the restraining wire, with the frangible restraint passing over and holding the restraining wire in the secured position and allowing said restraining wire to move into said release position when said frangible restraint fails in tension in response to the application of electrical current.

In a third embodiment, the present invention also provides an actuation barrier comprising a plurality of restraining parts with a blocked and open position and an interior surface; an activation pin having a head portion and a load portion interconnected to a load to be released adjacent to the load position and bearing against the restraining parts at said head portion when the restraining parts are in the blocked position and passing beyond the restraining parts in said open position; and the interior surfaces have at least one depression section against which the head portion of the activation pin does not bear when the restraining parts are in their blocked position.

In a fourth embodiment, the present invention also provides a base portion and restraining parts made primarily of steel at least partially coated with aluminum oxide.

In a fifth embodiment, the present invention also provides at least one and ideally two restraining pins, pin rigidly connected to the base portion and bearing against at least one of the plurality of restraining parts when the actuation barrier is in a blocked position, restraining movement of the actuation barrier relative to the base portion when the barrier is in the blocked position.

In a sixth embodiment, the present invention also provides a restraining wire wound around the actuation barrier at least once when in the blocked position to hold the restraining parts together, and unwinding to release the parts to move the barrier into the open position, and the diameter of said actuation barrier is equal to 0.8 times the square product of the diameter of the wire divided by a constant in the range of 0.021 to 0.031 and ideally 0.026.

In a seventh embodiment, the present invention also provides a head portion with two parallel flat sides and at least one restraining channel, located between the restraining parts, each restraining channel having a lower end and an upper end, said restraining channel restraining rotational movement of said head portion as the head portion passes through the channel but allowing rotational movement as the head portion passes above the channel so that the head portion may be inserted into the actuator and received by the lower end of the restraining channel with or without a load attached, passed through the channel and above the upper end thereof, rotated, ninety degrees, lowered and allowed to bare against and be resisted by said actuation barrier.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF THE PREFERRED EMBODIMENT

Figure 1:
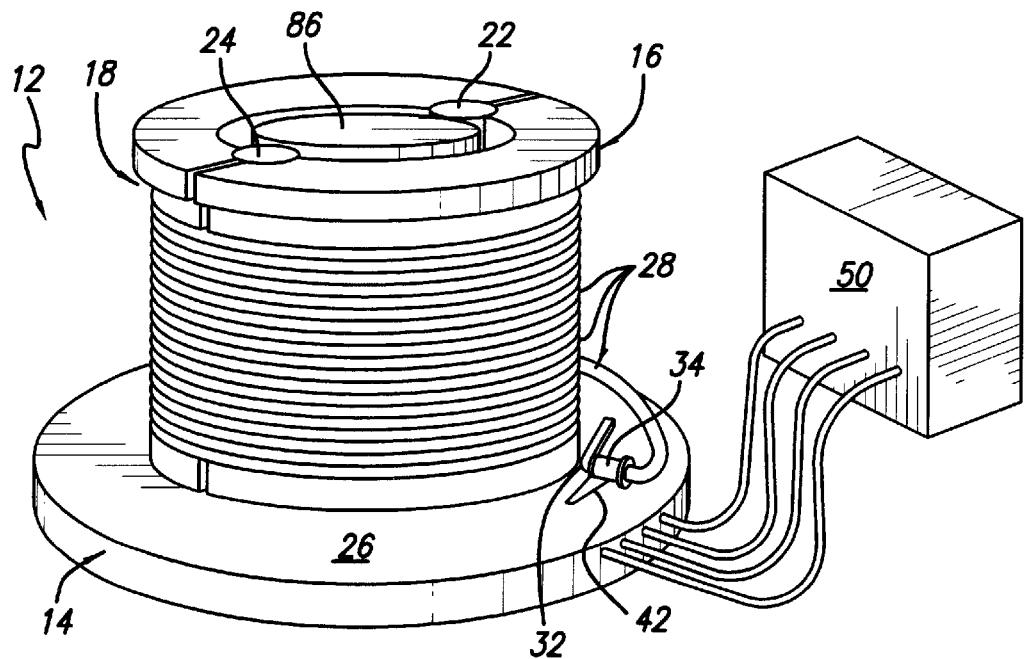
FIG. 1 is an isometric view of the present invention in a restrained state, showing it connected to redundant power supplies.
Figure 3:
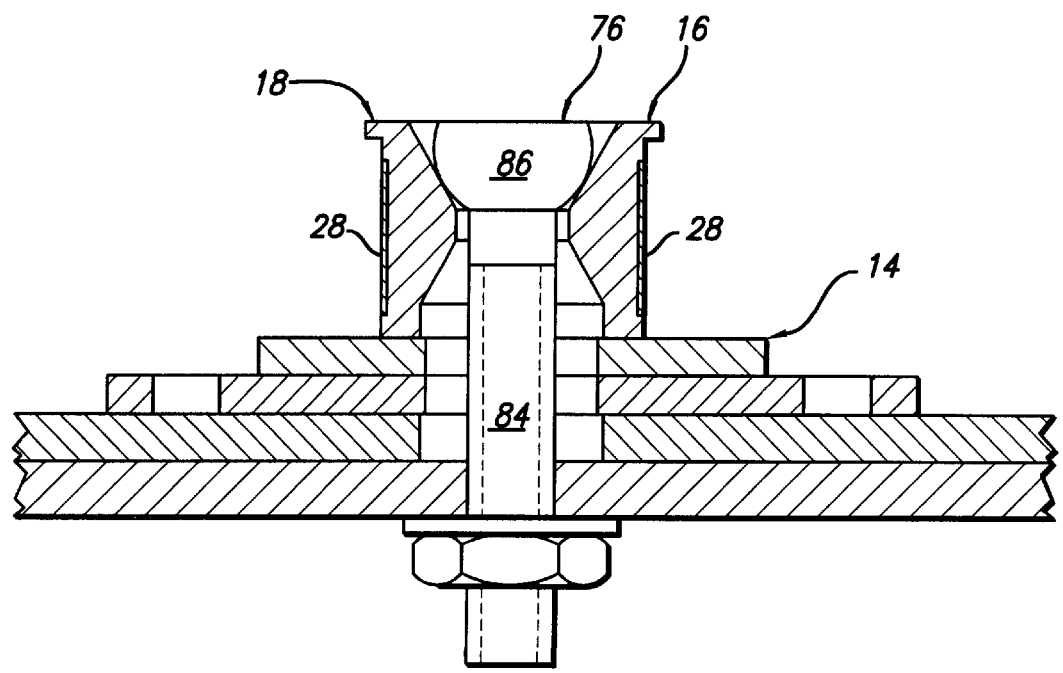
FIG. 3 is a cross sectional view of the present invention in a restrained state.

FIG. 1 shows a frangible actuator 12 constructed according to the present invention. The frangible actuator 12 has a base portion 14, a first half-spool 16, a second half-spool 18, and two restraining pins, a first restraining pin 22, and a second restraining pin 24. The two restraining pins 22 & 24 are rigidly mounted to the base portion 14, while the two half-spools 16 & 18 rest movably on an upper surface 26 of the base portion 14. The half-spools 16 & 18 and base portion 14 can be made of any number of materials, however it has been found that when loads are directly applied to the spool (as opposed to prior art mechanical advantage devices) metals such as stainless steel have a higher tensile strength and can handle greater loads. Half-spools made of 15-5 PH stainless steel have been found to be most satisfactory for many applications.

As noted above, it is desirable to make the half-spools 16 & 18 and base portion 14 non-conductive. Therefore, in a preferred embodiment, the stainless steel is coated with a layer of aluminum oxide ($Al_2O_3$) ideally $1/1000$ to $3/1000$ of an inch. The half-spools can be made in any number of sizes, depending upon the application, however it has been found that half-spools of diameter 0.8 inches and a height of 0.7 inches are well suited for loads of up to about 7,500 pounds. Similarly, the dimensions of the base portion 14 may be 2.0 inches by 1.5 inches, and the restraining pins 0.125 inches in diameter and 0.7 inches in height in a preferred embodiment suitable for many aerospace applications. The upper surface 26 of the base portion 14 may also be coated with aluminum oxide to further prevent accidental grounding.

Figure 2:
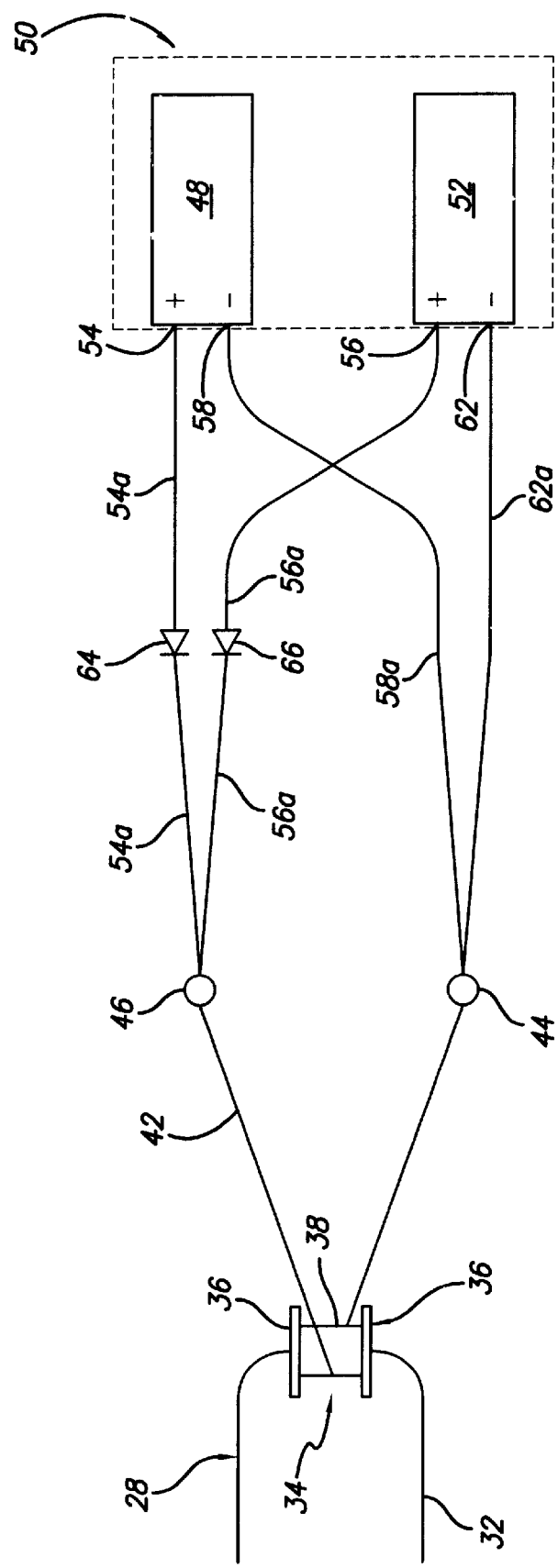
FIG. 2 is a schematic drawing of the circuitry of the present invention, showing both the frangible actuator (12) and redundant power supplies.
Figure 4:
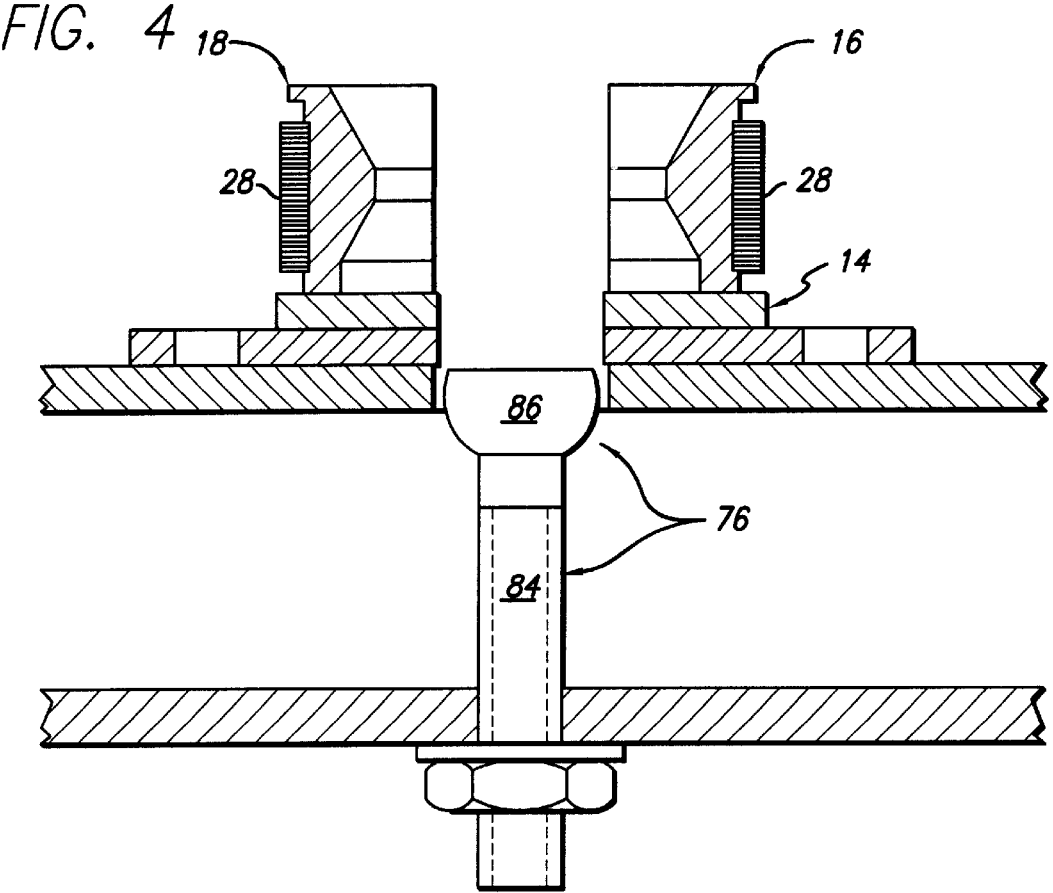
FIG. 4 is a cross sectional view of the present invention in a released state.
Figure 5:
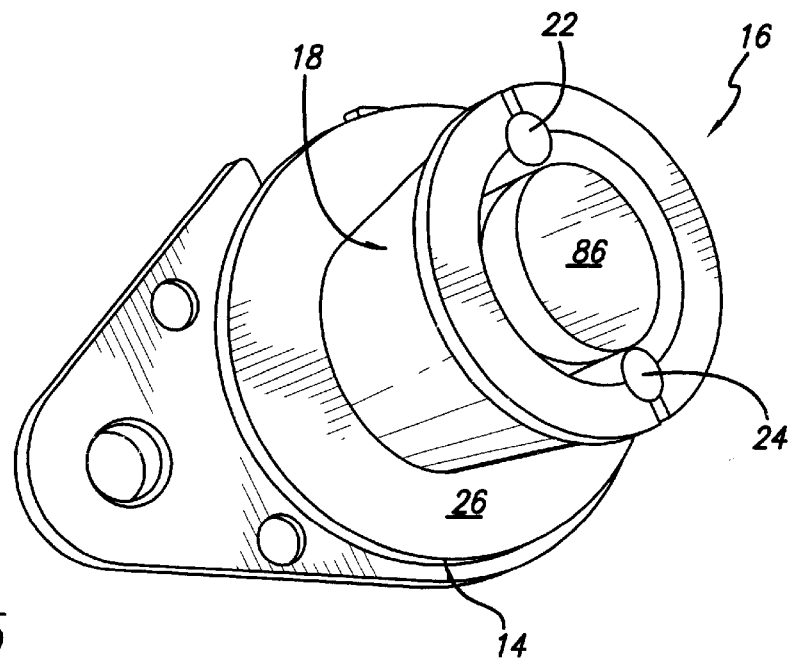
FIG. 5 is an isometric view of the present invention in a restrained state, with the restraining wire removed and the release pin (76) in place.

The frangible actuator 12 is held in a restrained position by a restraining wire 28 which has two ends, a loop-shaped release end 32 and an attachment end (not shown). The restraining wire 28 may be made of any number of materials with memory, such that if released it will return to its uncoiled state. Stainless steel wire has been found to be quite effective. A restraining wire 28 which is approximately five feet long will wrap around a spool of the above dimensions approximately twenty times and allow loads up to about 7,500 pounds with a minimum actuation current of about 2.0 amperes and ideally about 4.5 amperes. It has been found that the optimal relationship between wire and spool (formed of the two half-spools 16 & 18) can be calculated from the following formula:

$$S = 0.8(W/0.026)^2$$

where:

$S$=Spool Diameter $W$=Wire Diameter and the figure 0.026 may be anywhere in the range of 0.021 to 0.031. The attachment end is permanently mounted to one of the two half-spools 16 & 18. Mounting can be accomplished in any number of ways, such as welding, bolting, and other means customary in the trade. Referring to FIGS. 1 & 2, the loop-shaped release end 32 forms an open loop which passes over an insulator hub 34. The insulator hub 34 has a pair of parallel ridges 36 which form a central depression 38. The insulator hub 34 may be made of any number of non-conductive materials, such as polyamide imid (also known as TORLON® made by Amoco Chemical), and in a preferred embodiment need be no longer than $1/8$ inch. A fuse wire 42 passes through the insulator hub 34 and is attached thereto. The fuse wire 42 has two ends (shown in FIG. 2). As can be seen schematically in FIG. 2, the fuse wire 42 connects two terminals, fuse terminal 44 and fuse terminal 46, both terminals beneath the upper surface 26 of the base portion 14 (FIG. 1). For a frangible actuator 12 designed to handle loads of 7,500 pounds and having spools of the above dimensions, a fuse wire of a diameter of 0.004 inches has been found to be more than adequate. Such a wire will fail in tension with a current of about 2.0 amperes, however to provide a margin for error, in a preferred embodiment, a current of about 4.5 amperes may be employed.

A power supply 50 is provided which comprises at least two redundant power supplies, a primary power supply 48 and a secondary power supply 52. Three or more power supplies may be employed for added security, however for many applications two has been found to be adequate. In a preferred embodiment, both power supplies are direct current, with an output of about 4.5 amperes suitable for most applications. Each power supply has a positive and a negative terminal, such that primary power supply 48 has positive terminal 54 and negative terminal 58, and secondary power supply 52 has positive terminal 56 and negative terminal 62. Positive terminal 54 is connected by connecting wire 54-a to fuse terminal 46 via diode 64, which is wired in series and in a direction to permit the flow of current only in the direction from positive terminal 54 to fuse terminal 46. Similarly, positive terminal 56 is connected by connecting wire 56-a to fuse terminal 46 via diode 66, which also limits the flow of current to the direction from positive terminal 56 to fuse terminal fuse terminal 46. This prevents positive terminal 54 from grounding on positive terminal 56, and vice versa.

Negative terminal 58 and negative terminal 62 are directly connected to negative terminal 44 via connecting wires 58-a and 62-a, respectively. Thus if primary power supply 48 or secondary power supply 52 is activated, a current will be generated of at least about 2.0 amperes, which will pass through fuse wire 42 causing fuse wire 42 to fail in tension. In the embodiment disclosed, the redundant power supply of the present invention is used with a frangible actuator. However, the redundant power supply may be used with virtually any kind of actuator. For instance, the redundant power supply of the present invention may be used to directly actuate explosive bolts or other squibs, or to actuate a heater used to increase the temperature of a bimetal strip or other metals with memory (i.e., shape memory alloys) which will then return to its original configuration releasing a load, paraffin devices in which paraffin liquefies in response to heat eliminating the paraffins resistance to force, or other actuators.

As can be seen from FIGS. 1–6, the frangible actuator 12 comprises two half-spools, first half-spool 16 and second half-spool 18. Three third-spools, four forth-spools, or other combinations can be employed depending upon the application. The herein described half-spool embodiment has been found to work well in many aerospace applications.

A release pin 76 is provided that rests between the two half-spools, and extends through an aperture 78 formed in the base portion 14. The release pin 76 has a shaft section 84 and a restraining head portion 86. In an embodiment suitable for aerospace applications in which loads of about 3,500 to 6,000 pounds must be supported, a release pin 76 fabricated of 15-5 PH stainless steel and having the diameter of ¼ inch, with an restraining head portion 86 fabricated of 15-5 PH stainless steel and having the dimensions of a spherical diameter of about 0.5 inches have proven useful.

Figure 6:
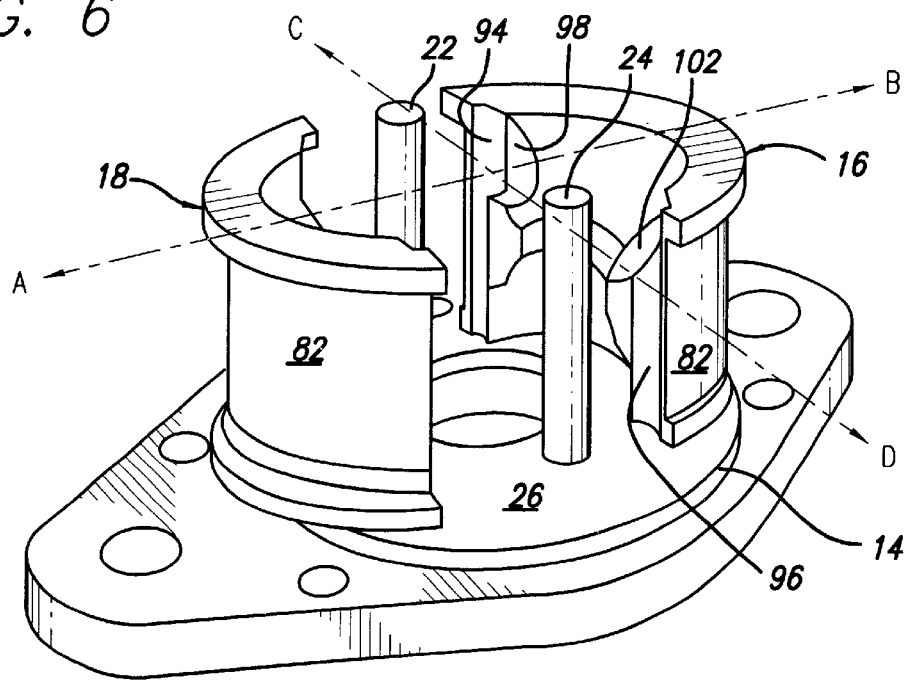
FIG. 6 is an isometric view of the present invention in a released state, with the restraining wire removed and without the release pin (76).
Figure 7:
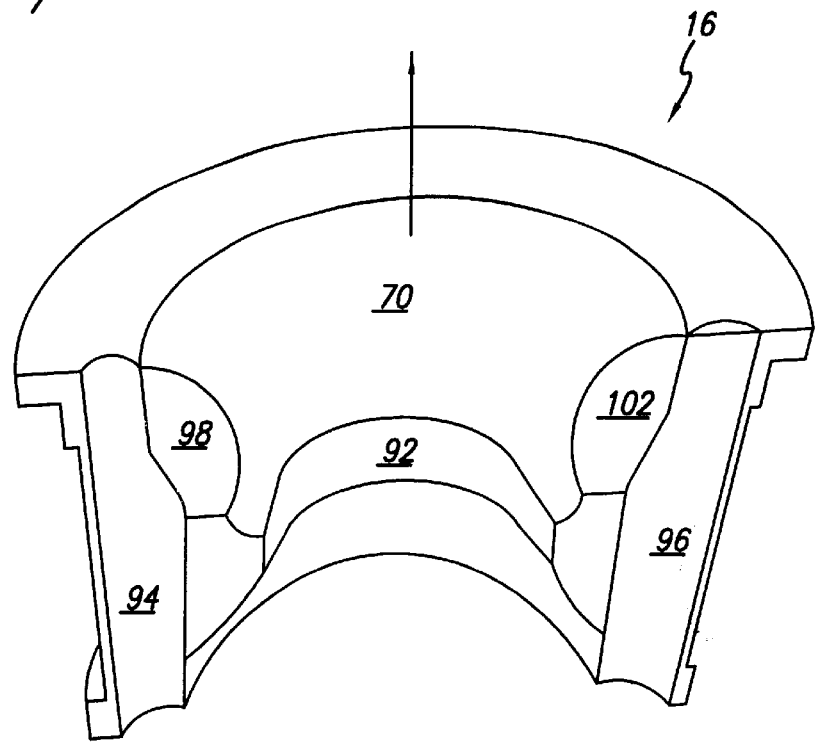
FIG. 7 is an isometric view of one of the two half-spools (16) and the release pin (76) of the present invention.

The two half-spools are quite similar, so only first half-spool 16 need be discussed in detail. Referring to FIGS. 6 & 7, first half-spool 16 has a generally vertical exterior wall 82 which when mated with the exterior wall 82 of the other second half-spool 18 has a generally tubular shape. The first half-spool 16 has an interior surface 70 which is somewhat conical in shape, being an approximately sixty degree cone having a base diameter of about 0.83 inches at a shaft aperture 92 (which is sized to allow the shaft section 84 of the release pin 76 to pass through, but to restrain the restraining head portion 86). The conical interior receives the restraining head portion 86 of the release pin 76.

In a preferred embodiment, the half-spools 16 & 18 are of a greater hardness than the restraining head portion 86 of the release pin 76 (e.g., the half-spools 16 & 18 being made of 15-5 PH stainless steel, and the restraining head portion 86 of 15-5 PH stainless steel). Were the restraining head portion 86 and half-spools 16 & 18 made of materials of the same hardness, a cold welding could take place, resulting in possible failure of the device (of course, were the restraining head portion 86 of a harder material than the half-spools 16 & 18 could mold around the restraining head portion 86, again resulting in failure).

The first half-spool 16 has a pair of pin recesses, pin recess 94 and pin recess 96, each of which have a semicircular cross section, which when mated with their counterparts in second half-spool 18 form apertures surrounding the first restraining pin 22 and the second restraining pin 24.

First half-spool 16 also has a pair of elliptical cut-outs, cut-out 98 and cut-out 102. Because the interior surface 70 is shaped and sized to receive the restraining head portion 86, much of the surface area of the interior surface 70 actually touches the restraining head portion 86. However, the cut-outs 98 & 102 provide an area that does not touch any part of the restraining head portion 86, the advantages of which will be elaborated upon below. Each of the cut-outs 98 & 102 are recesses in the interior surface 70 of approximately 1/16 of an inch in depth. The pin recesses 94 & 96 each represent a half-sleeve, which when first half-spool 16 is mated to second half-spool 18 forms a complete sleeve having a diameter of about ⅛ of an inch and a height of about 0.7 inches.

In operation, the frangible actuator 12 will be prepared by bringing first half-spool 16 and second half-spool 18 together atop the upper surface 26, such that the first restraining pin 22 and second restraining pin 24 fit within the cavities created by the pin recess 94 and pin recess 96, and wrapping the restraining wire 28 around the mated spool. The insulator hub 34 is fitted over and attached to the loop-shaped release end 32 of the restraining wire 28.

The restraining wire 28 is held in place (wound around the spool section 68) by the fuse wire 42 passing over and restraining the insulator hub 34. The shaft section 84 of the release pin 76 is passed into a central aperture 104 until further movement is restrained by the restraining head portion 86 bearing against the interior surface 70. The load is then attached to the end of the release pin 76 distant from the restraining head portion 86 (in various embodiments the load may be attached at some other stage).

Actuation may be triggered automatically, by time, location, or any other variable. Actuation may also be triggered manually, providing a switch for use by an astronaut, pilot, or ground technician. Upon activation, the primary power supply 48 and secondary power supply 52 are both activated. Current from the primary power supply 48 flows from positive terminal 54 to fuse terminal 46 over connecting wire 54-a, over fuse wire 42 to fuse terminal 44 and over connecting wire 58-a to negative terminal 58, completing the circuit. The current in that completed circuit (in the above-described embodiment, about 2.0 amperes minimum and about 4.5 amperes ideally) is adequate to cause a failure in tension in fuse wire 42, which in turn releases loop-shaped release end 32 and the restraining wire 28. The restraining wire 28 unravels, thus no longer restraining movement of the first half-spool 16 and the second half-spool 18. The load is typically exerting some force against the release pin 76, in this embodiment pulling "downward". Prior to release of the restraining wire 28, movement had been resisted by the restraining head portion 86 bearing against the interior surface 70 of the first half-spool 16 and second half-spool 18. When the restraining wire 28 unravels, the half-spools are free to move aside, allowing the release pin 76 to drop thorough the frangible actuator 12 releasing the load. Should the primary power supply 48 fail for any reason, current will flow from the secondary power supply 52 (which is activated simultaneously with the primary power supply 48) completing the circuit and causing the fuse wire 42 to fail in tension. Diodes 64 & 66 prevent either of the two positive terminals (54 or 56) from serving as a ground for the other.

Failure during activation is a risk with any actuator. This risk is reduced in the present invention by the cut-outs 98 & 102 (in which material is removed adjacent to the two pins). As can be seen from FIG. 6 where the line between first restraining pin 22 and second restraining pin 24 is described as C-D, and a line passing through the center of the space between the two pins and perpendicular to C-D is described as A-B, because the units separate along the line A-B, C-D will receive more force than A-B. There can be no movement along C-D; thus the structures along that line are capable of resisting much more force than are those along A-B. Thus, the friction along line C-D may be so great as to cause enough force dissipation that the A-B force will not be enough to overcome that friction, and the device will fail. G & H model no. 8014 attempts to solve this problem by flattening one of more of the sides of the restraining head portion of the release pin. Unfortunately, if the pin is turned 90 degrees, the device will fail because the line C-D will have maximum surface area contact and thus friction. In the present invention, the cut-outs in each half-spool along line C-D (for example, cut-outs 98 & 102 in first half-spool 16) reduce the surface area, and thus the friction, resulting in a dissipation of force along line C-D, allowing proper movement along line A-B.

As described above, prior art mechanical advantage devices used an elaborate system of levers, planes, etc. which although taking some time after actuation to release a load, result in a very sudden release. This may damage the load due to mechanical shock. The present invention allows the load to drop more gradually as the restraining wire 28 unwinds around the spools. It was previously felt that while such direct release was quite advantageous compared to mechanical advantage devices, direct release required a spool that could withstand far greater force than the plastic spools typically used in such mechanical advantage devices. Metal spools were difficult to use because it was felt that any current transmitted through the fuse wire 42 may ground on the metal spool, preventing actuation and risking damage to other parts of the release vehicle. Additionally, attempts to add insulation add weight to the device and provide additional material that can become debris after actuation, interfering with moving parts and causing failure of the release mechanism. For instance, the G & H 8014 device insulates the entire fuse wire. The present invention utilizes the insulator hub 34 to isolate the frangible actuator 12, which because of its size and the fact that it is permanently attached to the loop-shaped release end 32 of the restraining wire 28, simply travels with the unwinding restraining wire 28.

The present invention can be front or rear loaded, that is the load can be pushing against the spool from the top, or being pulled from the bottom.

Figure 8:
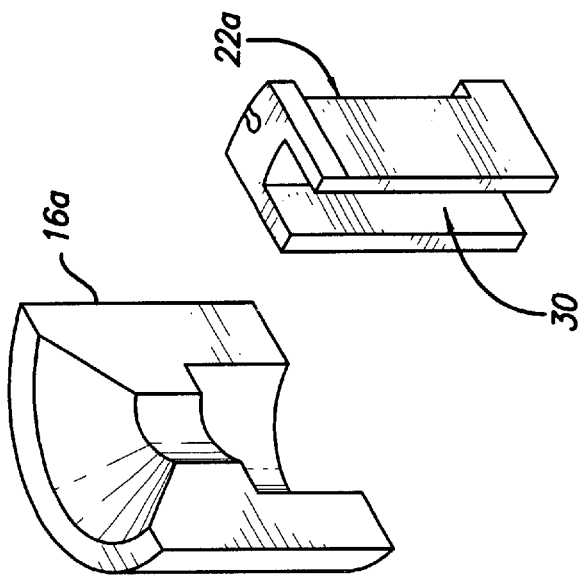
FIG. 8 is an isometric view of an alternative embodiment suitable for rear loading, with a modified shaft aperture (112) and also showing a flattened restraining head portion (106).
Figure 8:
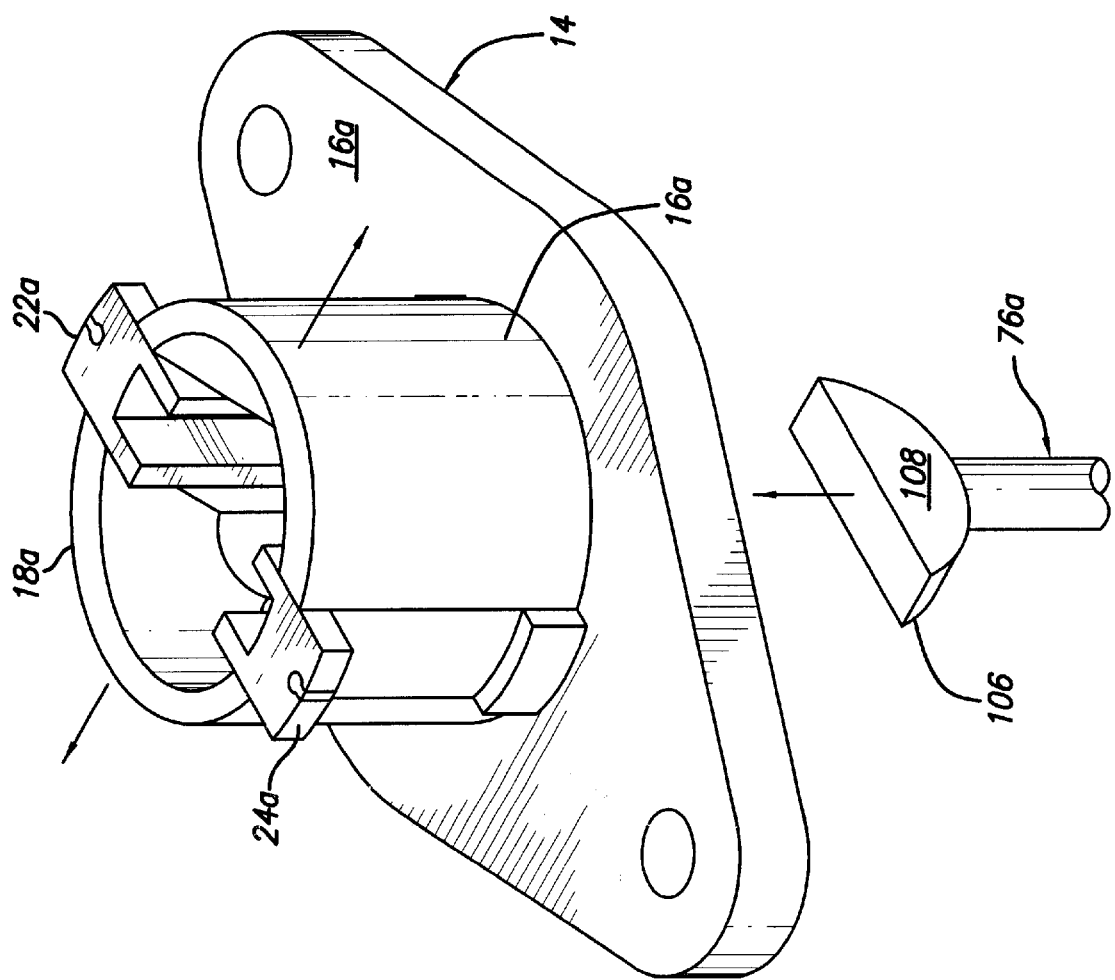

Another embodiment of the present invention provides a device useful for rear entry applications, in which a rod is employed having two flat sides. Once inserted it may be turned 90 degrees to lock in position, as shown by FIG. 8. Comparing FIG. 8 with FIGS. 5–7, first restraining pin 22 and second restraining pin 24 have been replaced with first restraining channel 22-a and second restraining channel 24-a, which are both stationary with respect to the upper surface 26 and base portion 14. First and second restraining channels 22-a, 22-b each have a groove, such as groove 30. Release pin 76 has been replaced with modified release pin 76-a, which is generally identical to release pin 76 except that in modified release pin 76-a, restraining head portion 86 has two flattened sides to form flattened restraining head portion 106 (only one flat side 108 is shown). A modified first half-spool 16-a and modified second half-spool 18-a are also provided. The modified half-spools 16-a & 18-a are identical to the previously described half-spools 16 & 18, except that pin recess 94 and pin recess 96 are absent in the modified half-spools, and the modified half-spools each represent a reduced arc to allow them to surround first restraining channel 22-a and second restraining channel 24-a and still approximate a circle. The modified half-spools 16-a and 18-a still include the shaft aperture 92 and cut-outs 102 & 98. Each groove 30 is sized to receive the flattened restraining head portion 106 only in an orientation such that each flat side 108 forms a plane passing through the two grooves 30. In operation, the modified release pin 76-a may be inserted through the base portion 14 in an orientation such that the flat side 108 travels within the grooves 30. Once the flat side of the flattened restraining head portion 106 is above the restraining channels 22-a & 22-b, the modified release pin 76-a is turned ninety degrees and then allowed to pass back into and abut the interior surface 70, just as with the other described embodiment. The weight of the load prevents the flattened restraining head portion 106 from migrating above the restraining channels 22-a & 22-b. This allows the load to be attached to the release pin 76 before insertion and further permits the rear loading discussed above. With the load in place, this embodiment functions identically to the earlier described embodiment.

Having now described the invention in accordance with the requirements of the patent statutes, those skilled in the art will understand how to make changes and modifications in the present invention to meet their specific requirements or conditions. Such changes and modifications may be made without departing from the scope and spirit of the invention as set forth in the following claims.

What is claimed is:

1. A frangible actuator comprising:

an actuation barrier comprising a plurality of restraining parts, and having a blocked position in which said restraining parts are in adjacent to each other and an open position in which said restraining parts are distant from each other;

a frangible restraint for maintaining and releasing said plurality of parts from the blocked position, said frangible restraint failing in tension upon the application of an electrical current such that in the absence of said electrical current said frangible restraint maintains the plurality of parts in the blocked position and upon said electrical current said frangible restraint releases said plurality of parts from the blocked to the open position, said frangible restraint having two electrical terminals, a first actuator terminal and a second actuator terminal;

a restraining wire having a secured position and a release position, for holding said plurality of parts in the blocked position when the restraining wire is in the secured position and releasing the plurality of parts into said open position when said restraining wire is in the release position, said restraining wire having a secured end, secured to one of said plurality of restraining parts and a loop end; and an insulator hub made of a nonconductive material surrounding a portion of the loop end of the restraining wire, with said frangible restraint passing over said insulator hub and thereby holding said restraining wire in the secured position and allowing said restraining wire to move into said release position when said frangible restraint fails in tension in response to the application of electrical current.

2. A frangible actuator comprising:

an actuation pin and an actuation barrier, said actuation barrier comprising a plurality of restraining parts, and having a blocked position in which said restraining parts are in adjacent to each other and an open position in which said restraining parts are distant from each other, each restraining part having an interior surface;

an activation pin having a head portion and a load portion, said pin interconnected to a load to be released adjacent to the load position and bearing against the restraining parts at said head portion when the restraining parts are in said blocked position and passing beyond the restraining parts in said open position; and said interior surfaces have at least one depression section against which the head portion of the activation pin does not bear when the restraining parts are in their blocked position.

3. A frangible actuator comprising:

an actuation pin and an actuation barrier, said actuation barrier comprising a plurality of restraining parts, and having a blocked position in which said restraining parts are in adjacent to each other and an open position in which said restraining parts are distant from each other, each restraining part having an interior surface;

an activation pin having a head portion and a load portion, said pin interconnected to a load to be released adjacent to the load portion and bearing against the restraining parts at said head portion when the restraining parts are in said blocked position and passing beyond the restraining parts in said open position; and said restraining parts being made primarily of steel at least partially coated with aluminum oxide.

4. The frangible actuator of claim 3 further comprising: a base portion for supporting said restraining parts, said base portion being made primarily of steel at least partially coated with aluminum oxide.

5. A frangible actuator comprising:

an actuation pin, a base portion and an actuation barrier, said actuation barrier comprising a plurality of restraining parts adjacent to said base portion, and having a blocked position in which said restraining parts are in adjacent to each other and an open position in which said restraining parts are distant from each other.

an activation pin having a head portion and a load portion, said pin interconnected to a load to be released adjacent to the load portion and bearing against the actuation barrier at said head portion when the barrier is in said blocked position, and passing beyond the barrier to release said load when the barrier is in the open position; and at least one restraining pin, said restraining pin rigidly connected to said base portion and bearing against at least one of the plurality of restraining parts when said actuation barrier is in said blocked position;

whereby said at least one restraining pin restrains movement of the actuation barrier relative to the base portion when the barrier is in the blocked position.

6. The frangible actuator of claim 5 further wherein said at least one restraining pin further comprises two restraining pins.

7. A frangible actuator comprising:

an actuation pin and an actuation barrier, said actuation barrier comprising a plurality of restraining parts, and having a blocked position in which said restraining parts are in adjacent to each other and an open position in which said restraining parts are distant from each other, and a restraining wire wound around the actuation barrier at least once when said actuation barrier is in the blocked position to hold said plurality of restraining parts together, and unwinding to release said restraining parts to move the barrier into the open position; and wherein the diameter of said actuation barrier is equal to 0.8 times the square product of the diameter of the wire divided by a constant in the range of 0.021 to 0.031.

8. The frangible actuator of claim 7 wherein said constant is approximately 0.026.

9. An actuator comprising:

an actuation pin and an actuation barrier, said actuation barrier comprising a plurality of restraining parts, and having a blocked position in which said restraining parts are in adjacent to each other and an open position in which said restraining parts are distant from each other, each restraining part having an interior surface;

an activation pin having a head portion and a load portion, the head portion having two approximately parallel flattened sides, said pin interconnected to a load to be released adjacent to the load position and said pin bearing against the restraining parts at said head portion when the restraining parts are in said blocked position and passing beyond the restraining parts in said open position; and at least one restraining channel, located between two of said restraining parts, each restraining channel having a lower end and an upper end, said restraining channel restraining rotational movement of said head portion as the head portion passes through the channel but allowing rotational movement as the head portion passes above the channel;

wherein the head portion may be inserted into the actuator and received by the lower end of the restraining channel with or without a load attached, passed through the channel and above the upper end thereof, rotated, lowered and allowed to bare against and be resisted by said actuation barrier.

10. The actuator of claim 9 wherein said head portion may be inserted into the actuator and received by the lower end of the restraining channel with or without a load attached, passed through the channel and above the upper end thereof, rotated approximately ninety degrees, lowered and allowed to bare against and be resisted by said actuation barrier.

11. The frangible actuator of claim base portion 10 wherein said interior surfaces have at least one depression section against which the head portion of the activation pin does not bear when the restraining parts are in their blocked position.

* * * * *

UNITED STATES PATENT AND TRADEMARK OFFICE
CERTIFICATE OF CORRECTION

PATENT NO. : 6,433,990 B1
APPLICATION NO. : 09/498761
DATED : August 13, 2002
INVENTOR(S) : Edward Rudoy et al.

It is certified that error appears in the above-identified patent and that said Letters Patent is hereby corrected as shown below:

Col. 8, Claim 2 (line 56): Delete "an actuation pin and"
    Col. 9, Claim 5 (line 24): Delete "an actuation pin, a base portion and"
    Col. 9, line 6, Col. 9, line 48, & Col. 10, line 12: Delete "an actuation pin"

Signed and Sealed this

Twenty-ninth Day of June, 2010

David J. Kappos
*Director of the United States Patent and Trademark Office*